United States Patent [19]

Wolfe et al.

[11] Patent Number: 4,531,299

[45] Date of Patent: Jul. 30, 1985

[54] ANALOG INCLINATION DATA SYSTEM

[75] Inventors: Lewis E. Wolfe; Ross K. Howard, both of Ventura, Calif.

[73] Assignee: The United States of America as represented by the Secretary of the Navy, Washington, D.C.

[21] Appl. No.: 592,038

[22] Filed: Mar. 21, 1984

[51] Int. Cl.³ .............................................. G01C 9/06
[52] U.S. Cl. ......................................... 33/366; 33/301
[58] Field of Search ............. 33/1 N, 1 PT, 301, 333, 33/343, 366

[56] References Cited

U.S. PATENT DOCUMENTS

| | | | |
|---|---|---|---|
| 3,537,307 | 11/1970 | Pliha | 33/366 |
| 3,851,399 | 12/1974 | Edwards | 33/333 |
| 3,938,258 | 2/1976 | Zook | 33/366 |
| 3,945,128 | 3/1976 | Weiss | 33/366 |
| 4,277,895 | 7/1981 | Wiklund | 33/366 |
| 4,470,199 | 9/1984 | Krezak et al. | 33/366 |

FOREIGN PATENT DOCUMENTS

| | | | |
|---|---|---|---|
| 3139239 | 8/1982 | Fed. Rep. of Germany | 33/1 N |
| 832334 | 5/1981 | U.S.S.R. | 33/366 |

Primary Examiner—Richard R. Stearns
Attorney, Agent, or Firm—Robert F. Beers; Joseph M. St.Amand; Thomas M. Phillips

[57] ABSTRACT

A means for taking roller paths inclination data as part of a weapon system alignment sequence. An accelerometer sensor sends out a DC signal representative of tilt. This signal is amplified and fed to a difference amplifier where a reference signal from a similar channel is subtracted. The difference signal is filtered to remove ship's motion and sent to a scaler circuit for providing an output voltage representing the inclination difference between the two sensors.

7 Claims, 1 Drawing Figure

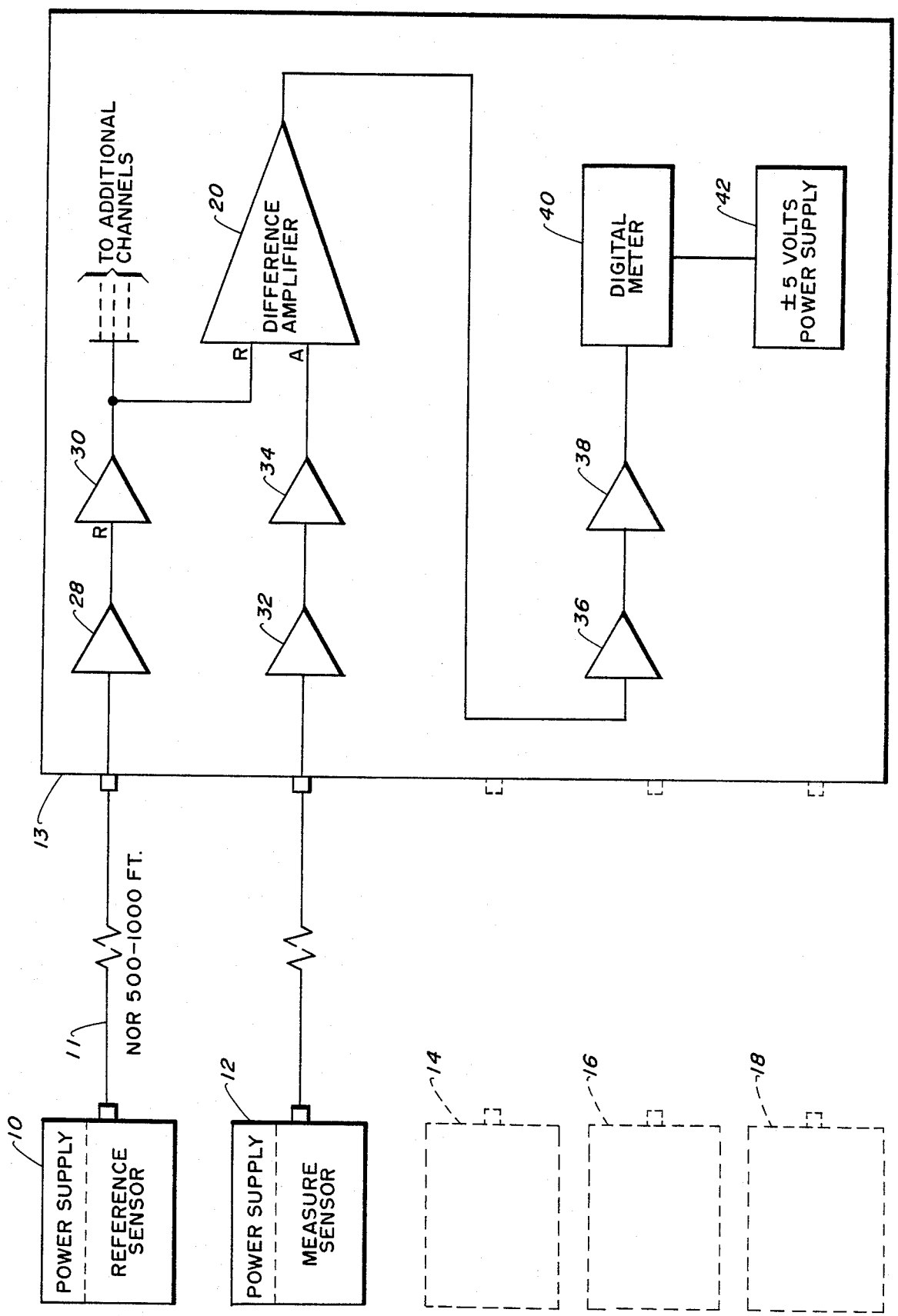

ANALOG INCLINATION DATA SYSTEM

BACKGROUND OF THE INVENTION

The present invention relates to a means for taking roller path inclination data as part of a weapons system alignment sequence. And more particularly to a servo-accelerometer sensor and signal conditioning circuitry capable of detecting very small angular displacements.

In order for a ship at sea to launch weaponry with the desied accuracy, part of the weapons system alignment sequence requires taking roller path inclination data so that all elements of the system will be referenced to the same reference plane. Ships at sea, however, are subject to pitch and roll; which motions affect the angular position of the ship with respect to the true vertical. Accordingly, as a ship rolls or pitches anything mounted on the ship, such as a weapons launching system would also become angularly offset from the true vertical.

Since the alignment of the weapon systems is done at night which is the time that ship and temperature conditions are the most stable, the human error factor is large. Eye fatigue from "marking a small bubble in a vial" is a great cause of error. Also, mental arithmetic suffers in the early morning hours, and many recording errors or calculations have caused reversed plots of data or wrong entries.

Bubble devices are an acceptable means of taking roller path inclination data if the allowable element tolerance is within the accuracy of the bubble device. It must be considered that use of a bubble device requires human judgment as to when the bubbles are matched during a data run, and therefore may affect the accuracy of the bubble device by as much as 20 arc seconds. Added to this are the ship flexure, ship load change, solar and thermal effects, and localized structural changes. It becomes obvious how difficult it is to attain a precise weapon element alignment. Also, in using the bubble devices, an operator is required at each element of the system when measurements are being made.

SUMMARY OF THE INVENTION

The present invention provides for measuring the angular displacement between a weapon system support and a reference plane. One weapon support system or radar support is designated as the ship's reference plane and all other equipment supports are referenced to this plane. A sensor is positioned on the reference support and is fed as one input to a difference amplifier. The weapons support has a sensor for sensing its angular position and the output is fed to the same difference amplifier. The input signals to the difference amplifier are proportional to angular displacement, therefore, the output of the difference amplifier is a measure of the difference in the inclination between the referenced support and the support being evaluated. The output from the difference amplifier is fed to a scaling amplifier to generate a signal that can be fed to a digital meter to indicate a digital output that reads in degrees. A very low pass filter (0.02 hertz) is used to filter the slow roll motion of the ship.

Accordingly, an object of the invention is the provision of an electronic inclinometer which overcomes the difficiencies of prior known inclinometer measuring systems.

Another object of the invention is the provision of an electronic inclinometer system where a sensor is placed on each element of the weapon system on which measurements are to be made and requires only one operator to monitor all elements from one location.

A further object of the invention is provision of an electronic inclinometer which permits ease of use and remote positioning of sensor at great distances.

Still another object of the invention is to provide an inclinometer system in which the sensors provide an output voltage (±5 volts DC) proportional to the tilt of the plane being measured permitting the use of single conductor miniature coax cable (RG-174).

Other objects, advantages and novel features of the invention will become apparence from the following detailed description of the invention when considered in conjunction with the accompanying drawings wherein:

BRIEF DESCRIPTION OF THE DRAWINGS

The single FIGURE is a block diagram of the preferred embodiment of the invention.

DESCRIPTION OF THE PREFERRED EMBODIMENT

Referring now to the drawings wherein there is shown in block diagram form an embodiment of the invention. A reference plane is established for the vessel carrying the weapon system by arbitrarily designating one of the elements of the weapon system as the reference. A sensor for measuring the tilt of the reference plane is positioned on the support of the selected element. All sensors, 10, 12, 14, 16 and 18 are the same and may be off-the-shelf servo accelerometers damped at $22H_z$ powered by ±15 volt power supply and provides an output of ±5 volts representing ±14.5 degrees of tilt. The output DC signal is fed through a coax cable 11 which may be RG-174 and the distance and length of the cable can be up to 1,000 feet. Normally the distance ranges between 500 and 1,000 feet between the sensor and the unit containing the electronic processor 13.

The signal from sensor 10 is fed through buffer amplifier 28 to a fixed-gain amplifier 30. This is to provide a signal to difference amplifier 20 with a known amplitude. The signal from measuring sensor 12 is fed through buffer amplifier 32 and amplified in a variable amplifier 34 where the gain and offset voltage are adjusted to equal the reference channel signal.

The measured signal is subtracted from the reference signal in difference amplifier 20 to provide an output which is proportional to the relative differences between the two input signals. The output signal from difference amplifier 20 is fed to a very low filter amplifier (0.02 hertz) for filtering out the rolling motion of the ship. The filtered signal out of filter amplifer 36 is fed to scaling amplifier 38 where the signal proportional to the difference in the inclination angle between the reference sensor and the measuring sensor is calibrated to provide an output signal that is proportional to degrees and is fed to digital meter 40 where a digital readout is provided. In a similar manner, the outputs of sensors 14, 16 and 18 would be compared with the reference signal from sensor 10 in additional channels. Power to the processing channels 13 is provided by a ±5 volt power supply 42.

Obviously many modifications and variation of the present invention are possible in light of the above teachings. It is therefore to be understood that within the scope of the appended claims the invention may be practiced otherwise than as specifically described.

What is claimed is:

1. The method for measuring the angular displacement between elements of a weapon system and a reference plane, the steps of:
   a. providing a sensed reference signal proportional to the tilt of one element of the weapon system that has been designated the reference plane;
   b. providing a sensed measured signal proportional to the tilt of each of the other elements of said weapon system;
   c. subtracting said reference signal from each of said measured signals to provide difference voltages;
   d. filtering each of said measured signals to remove the effect of the low frequency motion of said elements; and
   e. scaling said difference voltages to provide output signals proportional to the difference in tilt between said reference element and each of the measured elements.

2. In a device for taking roller path inclinations data as part of a weapon system and alignment sequence, the combination comprising:
   a. first circuit sensing means including an accelerometer for generating an output signal proportional to the tilt of a reference plane;
   b. second circuit means including an accelerometer for generating an output signal proportional to the tilt of an element of said weapon system;
   c. subtracting circuit means connected to said first and second circuit sensing means for subtracting said first generated signal from said second generated signal and providing an output signal that is proportional to the difference in tilt of said reference plane and said element of said weapon system; and
   d. filter circuit means connected to the output of said subtracting circuit means for substantially removing the effects of the slow roll motion of the ship.

3. The device of claim 2 wherein each of said circuit sensing means has a separate power supply.

4. The device of claim 2 further comprising a scaling circuit connected to said filter circuit means to allow for excessive fluctuations in power supply voltage and sensor voltage.

5. The device of claim 2 wherein said filter circuit means is tuned to $0.02 H_z$.

6. The device of claim 5 wherein the accelerometers of said first and second circuit sensing means have an output voltage of $\pm 5$ volts DC.

7. The device of claim 6 further comprising a single conductor miniature coax cable connecting the output signal of each of said circuit sensing means to said subtracting circuit means.

* * * * *